(12) United States Patent
Shinto et al.

(10) Patent No.: US 9,102,550 B2
(45) Date of Patent: Aug. 11, 2015

(54) ANAEROBIC TREATMENT METHOD

(75) Inventors: Hideaki Shinto, Tokyo (JP); Takaaki Tokutomi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 149 days.

(21) Appl. No.: 13/885,920

(22) PCT Filed: Nov. 18, 2011

(86) PCT No.: PCT/JP2011/076675
§ 371 (c)(1),
(2), (4) Date: May 16, 2013

(87) PCT Pub. No.: WO2012/070493
PCT Pub. Date: May 31, 2012

(65) Prior Publication Data
US 2013/0233795 A1 Sep. 12, 2013

(30) Foreign Application Priority Data

Nov. 26, 2010 (JP) ................................. 2010-263584

(51) Int. Cl.
*C02F 3/28* (2006.01)
*C02F 1/66* (2006.01)

(52) U.S. Cl.
CPC ............... *C02F 3/286* (2013.01); *C02F 3/2833* (2013.01); *C02F 1/66* (2013.01); *C02F 2209/06* (2013.01); *Y02E 50/343* (2013.01)

(58) Field of Classification Search
CPC .......... C02F 3/286; C02F 1/66; C02F 3/2833; C02F 2209/06
USPC .................................. 210/603, 615, 616, 617
See application file for complete search history.

(56) References Cited

U.S. PATENT DOCUMENTS

| | | | | |
|---|---|---|---|---|
| 4,735,723 A | * | 4/1988 | Mulder | 210/603 |
| 5,593,574 A | * | 1/1997 | VanToever | 210/150 |
| 6,391,202 B1 | * | 5/2002 | Knobloch et al. | 210/603 |
| 2007/0218537 A1 | | 9/2007 | Furukawa et al. | |

FOREIGN PATENT DOCUMENTS

| | | |
|---|---|---|
| CN | 1938233 A | 3/2007 |
| JP | S60-031899 A | 2/1985 |
| JP | H04-110097 A | 4/1992 |
| JP | H06-154785 A | 6/1994 |
| JP | 2008-068233 A | 3/2008 |
| JP | 2010-042352 A | 2/2010 |
| TW | 200730445 A | 8/2007 |

OTHER PUBLICATIONS

Taiwan Patent Office, "Office Action for TW 100142725," Feb. 6, 2015.

\* cited by examiner

*Primary Examiner* — Fred Prince
(74) *Attorney, Agent, or Firm* — Manabu Kanesaka

(57) ABSTRACT

In an anaerobic treatment method in which contaminated water is introduced into an acidification tank to decompose polymer components in the contaminated water into organic acids, and the effluent from the acidification tank is introduced into a methane production tank containing non-biological fluidized carriers so as to convert the acids into methane, the treatment is carried out stably and continuously by preventing the occurrence of floating of carriers in the methane production tank. The $COD_{Cr}$ concentration of polymer components other than organic acids in the acidification tank effluent to be introduced into the methane production tank is controlled to be not more than 300 mg/L. This control prevents the occurrence of acid production reactions in the methane production tank and the consequent proliferation of microorganisms, and thereby suppresses sticking of carriers as well as the occurrence of floating and blockage by the carriers.

6 Claims, 1 Drawing Sheet

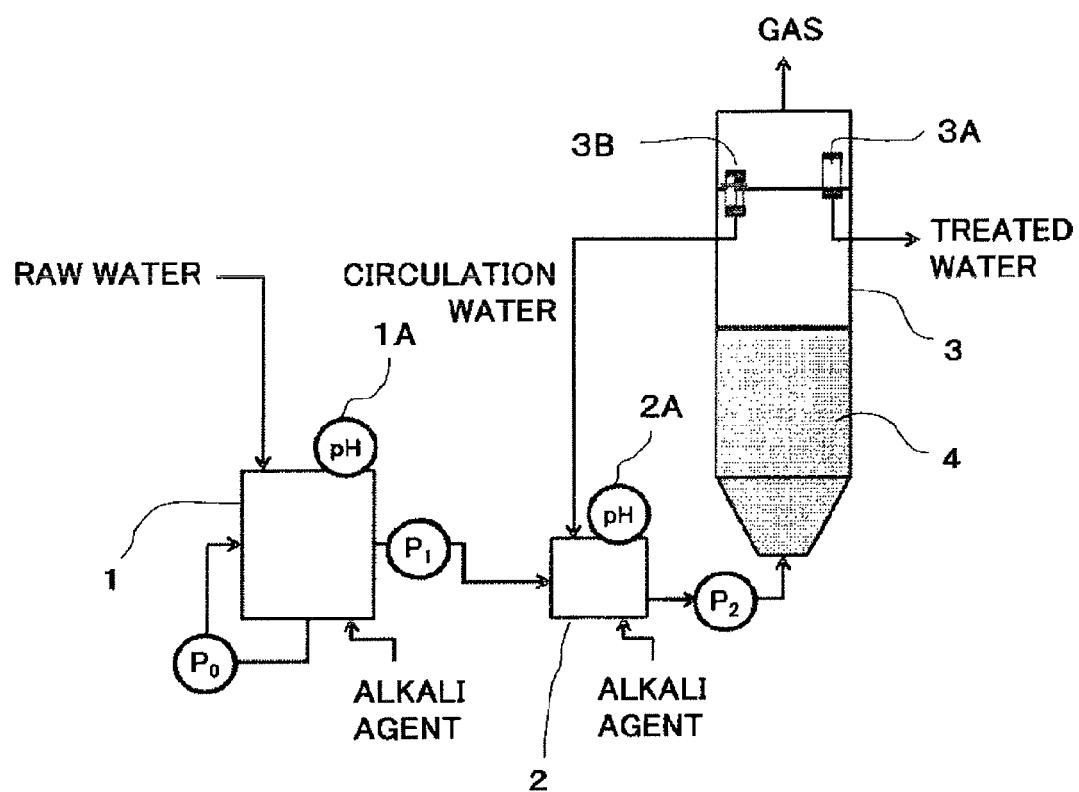

ANAEROBIC TREATMENT METHOD

FIELD OF INVENTION

The present invention relates to an anaerobic treatment method in which contaminated water is introduced into an acidification tank to decompose polymer components in the contaminated water into organic acids, and the effluent from the acidification tank is introduced into a methane production tank containing non-biological fluidized carriers so as to ferment the acids into methane.

BACKGROUND OF INVENTION

UASB (upflow anaerobic sludge blanket) methods are high-load and high-speed treatments utilized to anaerobically treat organic wastewater by allowing the organic wastewater containing soluble BOD to flow upward in a reaction tank and to be brought into contact with a sludge blanket formed by a dense and highly settling granule sludge in the tank. According to such a method, indigestive solid organic substances are separated before individual treatments, and rapidly digestible soluble organic substances alone are anaerobically treated with high load and high speed by using granule sludge having a high concentration of anaerobic microorganisms. An advanced form of UASB method is EGSB (expanded granule sludge blanket) method that enables higher loads of anaerobic treatment by allowing wastewater to flow at a faster rate in a taller reaction tank so as to expand a sludge blanket.

In granule sludge anaerobic treatments such as UASB method and EGSB method, sludge containing anaerobic microorganisms forms granules inside reactor. Because such anaerobic treatment methods achieve higher sludge concentration compared to fixed-bed or fluidized-bed treatments in which sludge is supported on carriers, high-load operation is feasible. Further, quick and efficient startup is possible simply by acquiring extra sludge from other treatment systems in operation.

These methods using granule sludge are very efficient when wastewater has high COD concentration (generally $COD_{Cr}$ concentration of not less than 2000 mg/L). When the COD concentration is low (generally $COD_{Cr}$ concentration of not more than 2000 mg/L), however, a large amount of water has to be flowed in a reaction tank, causing granules to outflow. Consequently, stable operation may be infeasible.

In the case where the types or compositions of wastewater to be treated by these methods are such that the formation of granules becomes difficult, the granules initially added are gradually broken or washed out and can possibly render the system inoperable.

In contrast, methods utilizing non-biological fluidized carriers are advantageously applicable even to wastewater having low COD concentration or wastewater accompanying granule breakage because outflow of the carriers from reaction tanks can be prevented by mechanical apparatus such as screens. Fluidized carriers provide a place for the growth of microorganisms.

Organic wastewater containing polymer components such as sugars and proteins are treated with a two-phase anaerobic treatment apparatus utilizing an acidification tank and an anaerobic reaction tank. Such organic wastewater is introduced into the acidification tank where polymers in the wastewater are decomposed into low-molecular organic acids such as acetic acid, propionic acid, and thereafter the waters is treated in the reaction tank containing granules or carriers.

When wastewater contains only compounds directly digestible by methanogenic bacteria such as methanol, or acetic acid, efficient treatment is possible with a single-phase treatment apparatus without an acidification tank by allowing the contaminated waters to flow directly through a reaction tank containing granules or carriers. Contaminated water containing large amounts of polymer components may be introduced into an acidification tank beforehand in order to decompose the polymer components into low-molecular compounds, whereby such wastewater can be treated in a subsequent reaction tank with high treatment efficiency.

Patent Document 1 describes an anaerobic treatment method in which an organic wastewater is treated in an acidification tank and is thereafter treated in a UASB methane production tank while flowing upward through the methane production tank. In the anaerobic treatment described in Patent Document 1, the sugar/$COD_{or}$ ratio in the liquid to be introduced into the methane production tank is controlled such that granule sludge having high activity and high settling tendency in the UASB methane production tank.

Patent Document 2 describes a method for treating beer wastewater in which a beer wastewater with high concentration is treated in an acidification tank (a raw water control tank), thereafter diluted to a $COD_{Cr}$ concentration of not more than 3000 mg/L, and introduced into a fluidized-bed methane fermentation tank containing carriers, thereby coping with variations in amounts and qualities of wastewater.

LIST OF DOCUMENTS

Patent Document 1: Japanese Patent Publication H6-154785A

Patent Document 2: Japanese Patent Publication H4-110097A

OBJECT AND SUMMARY OF INVENTION

Unlike the granule methods, anaerobic treatment methods utilizing non-biological fluidized carriers are capable of stable treatment of wastewater having low concentrations or unbalanced compositions. However, biofilms that have become attached to carriers are enlarged during the continuation of treatments, and consequently carriers stick to one another and such collections of carriers float.

Floating of carriers can cause operational failures such as low treatment capacity due to the generation of scums at an upper part of a reaction tank (a methane production tank containing carriers), and blockage of pipes by the accumulation of carriers in flow channels.

The present invention provides an anaerobic treatment method which solves these problems.

The present inventors carried out studies in order to solve the above problems. As a result, the present inventors have found that an anaerobic treatment in which contaminated water is introduced into an acidification tank to decompose polymer components in the contaminated water into organic acids, and the effluent from the acidification tank is introduced into a methane production tank containing non-biological fluidized carriers so as to ferment the acids into methane, can be carried out stably and continuously while preventing the occurrence of floating of carriers in the methane production tank by controlling the content of polymer components other than organic acids in the influent to be introduced into the methane production tank so as to be not more than a specific value.

The present invention has been accomplished based on the above finding. A summary of the invention is as follows.

[1] An anaerobic treatment method including introducing contaminated water into an acidification tank to decompose a polymer component in the contaminated water into an organic acid, and introducing the effluent from the acidification tank into a methane production tank containing non-biological fluidized carriers to ferment the acid into methane, the method being characterized by controlling the $COD_{Cr}$ concentration of a polymer component other than the organic acid in the influent to be introduced into the methane production tank so as to be not more than 300 mg/L.

[2] The anaerobic treatment method described in [1], wherein the load in the methane production tank per microorganisms attached to the carriers is 1 to 10 kg-$COD_{Cr}$/kg-VSS/day.

[3] The anaerobic treatment method described in [1] or [2], wherein the polymer component other than the organic acid is an organic substance having 7 or more carbon atoms.

[4] The anaerobic treatment method described in any of [1] to [3], wherein the $COD_{Cr}$ concentration in the contaminated water is not less than 300 mg/L and the proportion of $COD_{Cr}$ of the polymer component other than the organic acid is not less than 30% relative to the total $COD_{Cr}$ in the contaminated water.

[5] The anaerobic treatment method described in any of [1] to [4], wherein the carriers have a size of 1.0 to 5.0 mm and a settling velocity of 200 to 500 m/hr.

ADVANTAGEOUS EFFECTS OF INVENTION

According to the present invention, contaminated water is introduced into an acidification tank to decompose a polymer component in the contaminated water into an organic acid, and the effluent from the acidification tank is introduced into a methane production tank containing non-biological fluidized carriers so as to ferment the acid into methane. The $COD_{Cr}$ concentration of a polymer component other than the organic acid in the influent to be introduced into the methane production tank is controlled to be not more than 300 mg/L. Consequently, the following mechanisms work to prevent the occurrence of carriers sticking together by the enlargement of biofilms, to prevent floating of carriers that have become stuck together, and to prevent the occurrence of operation failures such as blockage of flow channels. Thus, efficient anaerobic treatment can be performed stably and continuously for a long period.

In the acidification tank, polymer components are converted into organic acids while dispersed bacteria cells are generated. The dispersed bacteria cells flow into the methane production tank containing the carriers and flow out therefrom together with the treated water without being accumulated. When anaerobic protozoan organisms grow in the methane production tank, the dispersed bacteria cells are ingested by the protozoan organisms. The protozoan organisms are at a high position in the food chain, and the amount of growth thereof, namely, the amount of extra sludge formed is very small. Thus, the growth of protozoan organisms does not cause sticking and floating of carriers.

If more than prescribed amounts of residual polymer components are present in the acidification tank effluent that is to be treated in the methane production tank, acid forming reactions take place in the methane production tank. Acid producing microorganisms are known to have high growth rate, and therefore the amount of sludge produced by these microorganisms is far larger than that produced by methane producing bacteria. Thus, frequent acid forming reactions taking place in the methane production tank produce large amounts of microorganisms and consequently increase the probability of carriers sticking together via biofilms, resulting in the occurrence of floating and blockage problems.

Controlling the concentration of polymer components other than organic acids in the acidification tank effluent to be introduced into the methane production tank to be not more than 300 mg/L prevents the acid production reactions in the methane production tank and the consequent heavy proliferation of microorganisms, and thereby suppresses sticking of carriers as well as the occurrence of floating and blockage.

Granule methods require the presence of certain amounts of polymer components in an influent to be introduced into a methane production tank in order to maintain the amounts of granules. The present invention, in contrast, does not necessarily require the presence of polymer components because methane producing bacteria are grown on the surface of non-biological carriers. Thus, operation is possible in spite of the concentration being not more than 300 mg/L. The inventive method can treat organic acids and low-molecular organic wastewater that do not contain polymer components and thus do not tend to form granules.

BRIEF DESCRIPTION OF DRAWING

FIG. 1 is a system diagram illustrating a configuration of an anaerobic treatment apparatus used in EXAMPLES.

DESCRIPTION OF EMBODIMENTS

Embodiments of the invention will be described in detail below.

In an anaerobic treatment method according to the present invention, contaminated water is introduced into an acidification tank to decompose polymer components in the contaminated water into organic acids, and the effluent from the acidification tank is introduced into a methane production tank containing non-biological fluidized carriers so as to ferment the acids into methane. The $COD_{Cr}$ concentration of polymer components other than the organic acids in the influent to be introduced into the methane production tank is controlled to be not more than 300 mg/L.

The $COD_{Cr}$ concentration of polymer components other than organic acids in the acidification tank effluent to be introduced into the methane production tank can be controlled to be not more than 300 mg/L by the following approaches.

i) In accordance with the specification of the acidification tank, treatment conditions, for example, the retention time in the acidification tank is controlled to be not less than 2.5 hours so that the $COD_{Cr}$ concentration of polymer components other than organic acids in the effluent from the acidification tank will be not more than 300 mg/L.

ii) The contaminated water to be introduced into the acidification tank, or the effluent from the acidification tank is appropriately diluted with water free of such polymer components, for example, municipal water, industrial water or the effluent from the methane production tank, so that the concentration of polymer components other than organic acids in the influent to be introduced into the methane production tank will be not more than 300 mg/L.

The influent to be introduced into the methane production tank which has a $COD_{Cr}$ concentration of polymer components other than organic acids of not more than 300 mg/L may be water that is completely free of polymer components other than organic acids and contains only low-molecular organic components.

The polymer components other than organic acids are organic substances having 7 or more carbon atoms such as sugars, proteins, fats and oils. The low-molecular organic components are organic substances having 6 or less carbon atoms such as ethanol and methanol.

The $COD_{Cr}$ concentration of polymer components other than organic acids in water may be determined from the difference between the $COD_{Cr}$ concentration in the contaminated water and the $COD_{Cr}$ concentration of organic acids. The $COD_{Cr}$ concentration of organic acids may be determined by measuring the concentration of organic acids and converting the measured concentration of organic acids into a $COD_{Cr}$ concentration. The concentration of organic acids may be analyzed by known methods such as ion exchange, ion exclusion or reversed phase, liquid or gas chromatography. The $COD_{Cr}$ concentration of organic acids has a correlation with alkali consumption.

Accordingly, when properties of contaminated water vary, the $COD_{Cr}$ concentration of polymer components other than organic acids in the influent to be introduced into the methane production tank may be controlled to be not more than 300 mg/L by determining the concentration of organic acids and the concentration of polymer components other than the organic acids based on correlation equations obtained from the amounts of alkali added to the acidification tank and the methane production tank, and, based on the obtained concentration values, controlling conditions such as the treatment conditions in the acidification tank and the degree of dilution.

In the anaerobic treatment method of the present invention, the contaminated water to be treated in the acidification tank is preferably an organic wastewater in which the $COD_{Cr}$ concentration is not less than 300 mg/L and the proportion of $COD_{Cr}$ of polymer components other than organic acids is not less than 30% relative to the total $COD_{Cr}$ in the contaminated water.

Treatment is possible even without the application of the present invention if the contaminated water is a low concentration organic wastewater having a $COD_{Cr}$ concentration of not more than 300 mg/L or is a wastewater having a low proportion of $COD_{Cr}$ of polymer components other than organic acids relative to the total $COD_{Cr}$.

Anaerobic treatment methods utilizing carriers are more effective for treating low-concentration organic wastewater than granule methods. Thus, the $COD_{Cr}$ concentration of the contaminated waters to be treated in the invention is preferably not less than 300 mg/L, particularly preferably about 300 to 5000 mg/L, and especially preferably about 500 to 3000 mg/L, although not limited thereto.

The application of the present invention is particularly effective for organic wastewater containing relatively large amounts of polymer components other than organic acids, for example, organic wastewater in which the proportion of $COD_{Cr}$ of polymer components other than organic acids is not less than 30%, in particular about 40 to 80% relative to the total $COD_{Cr}$ in the contaminated water and the $COD_{Cr}$ content of polymer components other than organic acids is 300 to 4000 mg/L, in particular 500 to 2500 mg/L.

Examples of such organic wastewater include, but not limited to, production wastewater from facilities such as food factories, organic wastewater from facilities such as chemical plants, and general sewages.

In the invention, such an organic wastewater is first introduced into an acidification tank and polymer components are decomposed into low-molecular organic acids such as acetic acid and propionic acid. The treatment conditions in the acidification tank vary depending on conditions such as the biodegradability of wastewater, but are appropriately pH 5 to 8, preferably 5.5 to 7.0, temperature 20 to 40° C., preferably 25 to 35° C., and HRT 2 to 24 hr, preferably 2 to 8 hr.

The effluent from the acidification tank is introduced into a methane production tank containing non-biological fluidized carriers. This methane production tank may be a continuous stirred reaction tank equipped with a mixing device such as a stirrer, or an upflow reaction tank in which contents are mixed by water flow and generated gas. In particular, an upflow reaction tank is preferably used because the height and shape of the reaction tank can be set freely as well as because large amounts of carriers can be added.

The treatment conditions in a continuous stirred reaction tank or an upflow reaction tank are not particularly limited as long as desired treatment efficiency can be obtained. However, the following conditions may be adopted as examples.

<Continuous Stirred Reaction Tank>
Carrier packing rate: 10 to 30%
HRT: 1.0 to 24 hr
Tank load: 4.0 to 12.0 kg-$COD_{Cr}$/m³/day
Sludge load: 0.8 to 3.0 kg-$COD_{Cr}$/kg-VSS/day
pH: 6.5 to 7.5
Temperature: 25 to 38° C.

<Upflow Reaction Tank>
Carrier packing rate: 10 to 80%
HRT: 1.0 to 24 hr
Linear velocity (LV): 1.0 to 20 m/hr
Tank load: 4.0 to 32 kg-$COD_{Cr}$/m³/day
Sludge load: 0.8 to 3.0 kg-$COD_{Cr}$/kg-VSS/day
pH: 6.5 to 7.5
Temperature: 25 to 38° C.

In the methane production tank, the load per microorganisms attached to carriers is preferably 1 to 10 kg-$COD_{Cr}$/kg-VSS/day, and particularly preferably 2 to 8 kg-$COD_{Cr}$/kg-VSS/day. This load in the methane production tank ensures that treatment efficiency can be maintained at a high level while sticking of carriers due to the overgrowth of biofilms, floating of such carriers sticking together, and operation failures such as blockage of flow channels can be prevented more reliably. The load per microorganisms attached to carriers may be adjusted by controlling the flow rate of influent introduced into the methane production tank as well as by diluting the $COD_{Cr}$ concentration of the methane production tank influent with diluent water.

The amount of microorganisms attached to carriers (VSS content) may be determined by extracting proteins on carriers with alkali and quantitatively measuring the proteins by a known Bradford method. In this process, the VSS content is calculated assuming that the protein content in bacteria cells is 50%.

In the invention, the non-biological fluidized carriers loaded in the methane production tank preferably have a size of 1.0 to 5.0 mm and a settling velocity of 200 to 500 m/hr.

If the size of the carriers is excessively large, the surface area per volume of the reaction tank becomes disadvantageously small. Excessively small carriers exhibit low settling velocity and are difficult to separate from the treated water. The size of the carriers used in the invention is preferably 2.5 to 4.0 mm.

The size of carriers indicates what is generally called "particle diameter". For example, the size of rectangular carriers indicates the length of the longer side, the size of cubic carriers indicates the length of one side, and the size of columnar carriers indicates the diameter or the height of the column whichever is larger. In the case of carriers having different shapes from the above shapes, the particle diameter of such carriers is the largest distance between two parallel plates sandwiching the carriers.

In the invention, the sizes of the carriers may be such that the average size is in the range from 1.0 to 5.0 mm, and preferably 2.5 to 4.0 mm. That is, it is not necessary that all the carriers have the above sizes.

If the settling velocity of the carriers is excessively low, such carriers are easily lifted by water flow or generated gas and are accumulated as scums near the water surface. In methods utilizing non-biological carriers, biofilms are formed on the surface, and reactions which form gas take place within the biofilms. Thus, the observed specific density of carriers becomes smaller with the formation of biofilms. It is therefore necessary that the specific density of carriers themselves and the settling velocity thereof be determined while considering these effects of biofilms. If the settling velocity of carriers is excessively high, such carriers will not efficiently contact the contaminated waters, failing to achieve sufficient treatment efficiency. Further, carriers exhibiting such high settling velocitys form a bed and solids are accumulated thereto, causing problems such as blockage of passages. A more preferred settling velocity of the carriers used in the invention is 200 to 500 m/hr.

The settling velocity of carriers is a value determined by adding carriers to water (clean water such as tap water), collecting the carriers that have settled, adding these carriers into a graduated cylinder containing water (clean water such as tap water), and measuring the settling distance per unit time. In the invention, 10 or more, preferably 10 to 20 carriers are tested, and the average value is obtained as the settling velocity.

The carriers may be formed of any materials without limitation. Preferred materials are foams (I) and/or (II) described below. Such resin foams are also preferable because of easy control of specific gravity and particle diameter.

(I) Foams which contain 30 to 95 wt % of a resin component based on a polyolefin resin and 5 to 70 wt % of a cellulose-based powdery hydrophilizing agent, and which have melt fractures on the surface (hereinafter, also referred to as "foams (I)").

(II) Foams which contain 30 to 95 wt % of a resin component based on a polyolefin resin, 4 to 69 wt % of a cellulose-based powdery hydrophilizing agent and 1 to 30 wt % of an inorganic powder, and which have melt fractures on the surface (hereinafter, also referred to as "foams (II)").

Melt fractures are generally known as a consequence of a phenomenon in which roughness is produced on the surface of plastic articles during forming (known as rough surface). For example, such phenomena are encountered during extrusion of plastic materials and produce irregular rough surface or matte surface of articles as a result of excessively high internal pressure in the extruders, excessively high extrusion rate, or excessively low temperature of the plastic materials.

Melt fractures of the carriers in the invention preferably satisfy the specific surface area ratio represented by Equation (1) below.

$$B/A = 1.5 \text{ to } 4.0 \quad (1)$$

The letter A indicates the apparent specific surface area of foams and the letter B indicates the actual specific surface area of foams.

The apparent specific surface area A of foams is the specific surface area of foams having a flat and smooth surface, namely, without melt fractures. The actual specific surface area B is the specific surface area actually measured in the presence of melt fractures. That is, the B/A ratio according to Equation (1) indicates an increase in specific surface area by the occurrence of melt fractures. The B/A ratio being 1 means that the surface is completely free of roughness by melt fractures.

If the B/A ratio becomes less than 1.5, the area of contact between the contaminated water and the carriers is so decreased that the treatment capacity is disadvantageously lowered. If the B/A ratio exceeds 4.0, melt fractures on the surface are easily scraped by contact between the carriers during operation. Values of the apparent specific surface area A and the actual specific surface area B may be measured with automatic specific surface area/pore size distribution analyzer [Tristar 3000 manufactured by Shimadzu Corporation].

The resin components forming the foams preferably have a melt flow index of 5 to 25 g/10 min. Resin components having a melt flow index of less than 5 g/10 min are poor in fluidity and are unsuited for the production of foams. If the melt flow index exceeds 25 g/10 min, there is a risk that cells may be collapsed during foaming.

The melt flow index (hereinafter, sometimes abbreviated to "MFI") is an indicator of the fluidity of molten resins and is generally known as an index in terms of weight of resin extruded from nozzles (orifices) with a prescribed size at constant pressure and constant temperature per 10 minutes (unit: g/10 min). In the invention, values measured at 230° C. under 21.6 N load (DIN53735) are used.

Preferred examples of the resin components forming the foams (I) and (II) include polyethylene (hereinafter, sometimes abbreviated to "PE"), polypropylene (hereinafter, sometimes abbreviated to "PP") and ethylene-vinyl acetate copolymer (hereinafter, sometimes abbreviated to "EVA"). These resins may be used singly or may be combined appropriately into a mixture. The resin components forming the foams (I) and (II) may be polyolefin resins in combination with other thermoplastic resin components. Examples of such other thermoplastic resin components include polystyrene (hereinafter, sometimes abbreviated to "PS"), polyethylene terephthalate, polyvinyl chloride, polyvinylidene chloride, polycarbonate, polyurethane, polyamide, polyacetal, polylactic acid, polymethyl methacrylate and ABS resin.

Polyethylene is a particularly preferred resin component for forming the foams (I) and (II). As long as MFI is in the aforementioned range, mixtures of PE and other resins such as polyolefin resins may be used, with examples including mixtures of PE and PP, mixtures of PE and EVA, mixtures of PE, PP and EVA, mixtures of PE, PP and PS, mixtures of PE, PP, EVA and PS, and mixtures of these mixtures and other thermoplastic resins. In detail, it is preferable that the composition ratio (weight ratio) of PE, PP, EVA and other thermoplastic resins including PS be PE:PP:EVA:other thermoplastic resins including PS=100-60:40-0:20-0:15-0 provided that the total of the resins is 100. In order to increase the wear resistance of carriers, it is preferable that the resin components contain not less than 10 wt % of EVA. The resin components may be reprocessed resins.

Examples of the cellulose-based powders as hydrophilizing agents include wood powders, cellulose powders and hemp cellulose powders, with specific examples including sawdust, AVICEL, ARBOCEL, paper powders, cellulose beads, microcrystalline cellulose and microfibrillated cellulose. In particular, wood powders are preferably used. These may be used singly, or two or more may be mixed in appropriate proportions.

Exemplary shapes of hydrophilizing agents include spheres, ellipses, wedges, whiskers and fibers. Other shapes are also employable. Preferably, the hydrophilizing agents have particle diameters that pass 200-mesh screens, preferably 100-mesh screens, and more preferably 40-mesh screens.

In the invention, the hydrophilizing agents function to allow foams having closed cells to exhibit water permeability. In order to exert this function, the hydrophilizing agents are desirably exposed on or protrudent from the surface of foams. Here, the term "exposed" means that part of the surface of hydrophilizing agents is visible on the surface of foams, and the term "protrudent" means that part of the hydrophilizing agents protrudes through the surface of foams. That is, being exposed or protrudent means that the whole or a portion of the hydrophilizing agent is buried in the foams while part of the surface of the hydrophilizing agent is visible on the surface of the foams or part of the hydrophilizing agent protrudes through the surface of the foams.

Examples of the inorganic powders used in the foams (II) include barium sulfate, calcium carbonate, zeolite, talc, titanium oxide, potassium titanate and aluminum hydroxide. In particular, barium sulfate is preferably used. These inorganic powders may be used singly, or two or more kinds of inorganic powders may be used.

If the foams (I) and (II) contain the resin components at higher proportions and the hydrophilizing agents at lower proportions than described above, the foams do not exhibit sufficient water permeability imparted by the hydrophilizing agents and require a longer time to settle in water. If the proportion of the resin components is lower and that of the hydrophilizing agents is higher than described above, the strength of carriers is disadvantageously lowered.

The inorganic powders are blended in the foams (II) to serve as nucleating agents for foaming as well as to adjust specific gravity. A further aim is to reduce the amounts of resin components and hydrophilizing agents in order to save production costs. These effects by blending of the inorganic powders cannot be fully obtained if the proportion of the inorganic powders is lower than described above. Addition in excess of the above range results in disadvantageously large specific density.

As will be described later, the foams (I) and (II) are produced by foaming with foaming agents. It is preferable that the expansion ratio be 2 to 10 times and the specific density obtained from an apparent volume be 0.10 to 0.80 g/ml.

If the expansion ratio of the foams (I) and (II) is below the lower limit, the specific density becomes so large that the foams entail a large force to be fluidized in water. Foams having an expansion ratio in excess of the upper limit float easily on the water surface due to small specific density.

If the specific density obtained from an apparent volume is below the lower limit or is above the higher limit, the carriers may fail to satisfy the aforementioned settling velocity specified in the present invention. Here, the specific density obtained from an apparent volume of foams is a value (unit: g/ml) calculated with respect to the weight of foams with an apparent volume of 30 ml measured in a 50 ml graduated cylinder. This value is deemed as a substantive specific density because it is very difficult to measure the true volume of the foams (I) and (II) due to the presence of melt fractures on their surface. In the following, the specific density obtained from an apparent volume of foams will be simply referred to as "specific density".

The foams (I) and (II) may be produced by melt kneading the aforementioned polyolefin resins, hydrophilizing agents and inorganic powders, and further melt kneading foaming agents, then foaming the resultant mixtures and cutting the foams into predetermined sizes.

Examples of the foaming agents include sodium bicarbonate (soda) and azodicarbonamide. The foaming agents are not limited thereto, and further examples include chemical foaming agents and physical foaming agents.

Examples of the chemical foaming agents include azo compounds such as barium azodicarboxylate, nitroso compounds such as N,N-dinitrosopentamethylenetetramine, hydrazine derivatives such as 4,4'-oxybis(benzenesulfonylhydrazide), semicarbazide compounds, azide compounds, triazole compounds, isocyanate compounds, bicarbonates such as sodium bicarbonate, carbonates, nitrites, hydrides, mixtures of sodium bicarbonate and acids (for example, mixtures of sodium bicarbonate and citric acid), mixtures of hydrogen peroxide and enzymes, and mixtures of zinc powder and acids. Examples of the physical foaming agents include aliphatic hydrocarbons (such as butane, pentane and hexane), chlorohydrocarbons (such as dichloroethane and dichloromethane), fluorochlorohydrocarbons (such as trichloromonofluoromethane, dichlorodifluoromethane, dichloromonofluoromethane and dichlorotetrafluoroethane), chlorofluorocarbon alternatives, air, carbon dioxide, nitrogen gas and water. Of these, sodium bicarbonate (soda) is particularly preferable because of its low decomposition temperature and inexpensiveness.

So-called self foaming agents (closed cell foam blowing agents, microspheres or thermally expandable microcapsules) may be used as foaming agents. Self foaming agents form hollow spherical cells having exterior walls themselves upon foaming. Therefore, even when the resin composition is extruded and foamed in a gas phase (for example, air) instead of in water, the hollows of the foams are maintained without being collapsed, whereby the foams achieve desired expansion ratio. An example of the self foaming agents utilizes a polymer for forming outer walls such as a vinylidene chloride-acrylonitrile copolymer or an acrylonitrile-methacrylonitrile copolymer, as well as a volatile liquid encapsulated in the polymer such as isobutane or isopentane. Specific examples include EXPANCEL (manufactured by Japan Fillite Co., Ltd.) and EPD-03 (manufactured by Eiwa Chemical Ind. Co., Ltd.). In the present invention, the cellulose-based powdery hydrophilizing agents allow water to permeate the foams expanded by the self foaming agents. As a result, the resultant foams exhibit excellent water permeability.

The foaming agents may be used singly, or two or more may be used as a mixture. In order to obtain the preferred expansion ratio, the foaming agents are preferably used in an amount of 0.5 to 8 parts by weight with respect to 100 parts by weight of the total of the polyolefin resins and the hydrophilizing agents in the foams (I) and with respect to 100 parts by weight of the total of the polyolefin resins, the hydrophilizing agents and the inorganic powders in the foams (II).

EXAMPLES

The present invention will be described in greater detail by presenting examples and comparative examples.

Examples 1 to 3 and Comparative Example 1

Raw water was tested with an anaerobic treatment apparatus illustrated in FIG. 1. The water was a synthetic wastewater based on sugars and proteins ($COD_{Cr}$ concentration: 500 to 1500 mg/L, proportion of $COD_{Cr}$ of polymer components other than organic acids relative to the total $COD_{Cr}$: about 60%, pH: 7.0).

The anaerobic treatment apparatus was configured such that the raw water was treated in an acidification tank 1 and thereafter supplied via a pump $P_1$ to a pH adjustment tank 2 where the pH was adjusted, and via a pump $P_2$ the pH-adjusted water was allowed to flow upward through a methane production tank 3 containing non-biological fluidized carriers 4. Part of the effluent from the methane production tank 3 was circulated as circulation water to the pH adjustment tank 2, and the remaining part was discharged as treated water from the system. The water in the acidification tank 1 was circulated through a pump $P_0$. For pH adjustment, sodium hydroxide as an alkali agent was added to the acidification tank 1 and the pH adjustment tank 2. The reference signs 1A and 2A indicate pH meters, and the reference signs 3A and 3B are screens.

The treatment conditions in the acidification tank 1 and the methane production tank 3 were as follows.

<Acidification Tank>
Volume: 18 L
HRT: 1.5 hr
pH: 6.5
Temperature: 30° C.

<Methane Production Tank>
Volume: approximately 10 L (diameter 15 cm, height 60 cm)
HRT: 0.9 hr
Linear velocity (LV): 2 m/hr
pH: 7.0
Carrier packing rate: 40%
Carriers: polyolefin resin columnar carriers having a diameter of 2 mm, a height of 3 mm and a settling velocity of 300 m/hr The treatment rate was about 305 L/day. Before the start of the treatment, 2 L of dispersed anaerobic sludge (10 g-VSS/L) as seed sludge was added to the methane production tank 3.

Treatments were performed in a similar manner in EXAMPLES 1 to 3 and COMPARATIVE EXAMPLE 1, except that the $COD_{Cr}$ concentrations of the raw waters were changed as described in Table 1. Table 1 describes the results of measurements of the total $COD_{Cr}$ concentration and the $COD_{Cr}$ concentration of polymer components other than organic acids (described as "residual sugar $COD_{Cr}$ concentration" in Table 1) in the effluent from the acidification tank, as well as the $COD_{Cr}$ concentration in the effluent from the methane production tank and the presence or absence of carriers floating in the methane production tank.

Table 1 also describes the loads per microorganisms attached to the carriers in the methane production tank (described as "carrier loads" in Table 1).

The carrier loads were determined by measuring the amounts of microorganisms attached to the carriers in the methane production tank according to the aforementioned method (the measured amounts ranged from 8000 to 16000 mg-VSS/L-carriers), and performing calculations based on the obtained values and the loads in the methane production tank.

TABLE 1

|  | Total $COD_{Cr}$ in raw water (mg/L) | $COD_{Cr}$ concentration in effluent from acidification tank | | Carrier loads in methane production tank (kg-$COD_{Cr}$/kg-VSS/day) | $COD_{Cr}$ concentration in effluent from methane production tank (mg/L) | Floating carriers |
|---|---|---|---|---|---|---|
|  |  | Total $COD_{Cr}$ (mg/L) | Residual sugar $COD_{Cr}$ (mg/L) |  |  |  |
| EX. 1 | 500~600 | 300~400 | 100~200 | 1~4 | 50~100 | Absent |
| EX. 2 | 800~1200 | 400~800 | 150~300 | 2~8 | 100~200 | Absent |
| EX. 3 | 1200~1500 | 600~800 | 150~300 | 3~8 | 100~200 | Absent |
| COMP. EX. 1 | 1200~1500 | 700~1300 | 400~1000 | 3~12 | 300~400 | Present |

From Table 1, the following has been illustrated.

In EXAMPLES 1 to 3 in which the raw waters had a $COD_{Cr}$ concentration of 500 to 1200 mg/L, the acid production in the acidification tank resulted in a residual sugar $COD_{Cr}$ concentration of not more than 300 mg/L and consequently the carriers were not caused to float in the methane production tank. In COMPARATIVE EXAMPLE 1 in which the raw waters had a $COD_{Cr}$ concentration of 1200 to 1500 mg/L, however, the effluents from the acidification tank had various $COD_{Cr}$ concentrations, and floating of carriers occurred in the methane production tank in some cases and did not occur in other cases. When floating of carriers occurred, the residual sugar $COD_{Cr}$ concentration in the effluents from the acidification tank was confirmed to be more than 300 mg/L, in detail 400 mg/L or more. When floating of carriers did not occur, the residual sugar $COD_{Cr}$ concentration after the acidification tank was confirmed to be not more than 300 mg/L.

Although the present invention has been described in detail with respect to some specific embodiments, the skilled person will appreciate that various modifications are possible within the spirit and the scope of the invention.

This application is based upon a Japanese patent application filed on Nov. 26, 2010 (Japanese Patent Application 2010-263584), the entire contents of which are incorporated herein by reference.

The invention claimed is:

1. An anaerobic treatment method, comprising:
   introducing contaminated water into an acidification tank to decompose a polymer component in the contaminated water into an organic acid, and
   introducing effluent from the acidification tank into a methane production tank containing non-biological fluidized carriers to convert the organic acid into methane,
   wherein a retention time of the contaminated water in the acidification tank is controlled to be not less than 2.5 hours, thereby to control a $COD_{Cr}$ concentration of a polymer component other than the organic acid in the influent to be introduced into the methane production tank so as to be not more than 300 mg/L, and
   wherein the polymer component other than the organic acid is sugars, protein, or fats and oils, having 7 or more carbon atoms.

2. The anaerobic treatment method according to claim 1, wherein a load in the methane production tank per microorganisms attached to the carriers is 1 to 10 kg-$COD_{Cr}$/kg-VSS/day.

3. The anaerobic treatment method according to claim 1, wherein a $COD_{Cr}$ concentration in the contaminated water is not less than 300 mg/L and a proportion of the $COD_{Cr}$ of the polymer component other than the organic acid is not less than 30% relative to a total $COD_{Cr}$ in the contaminated water.

4. The anaerobic treatment method according claim 1, wherein the carriers have a size of 1.0 to 5.0 mm and a settling velocity of 200 to 500 m/hr.

5. The anaerobic treatment method according claim 1, wherein the $COD_{Cr}$ concentration of the polymer component other than the organic acid not more than 300 mg/L prevents acid production reactions in the methane production tank and heavy proliferation of microorganisms, to thereby suppress sticking of the carriers and occurrence of floating and blockage thereof.

6. An anaerobic treatment method, comprising:
  introducing contaminated water into an acidification tank to decompose a polymer component in the contaminated water into an organic acid, and
  introducing effluent from the acidification tank into a methane production tank containing non-biological fluidized carriers to convert the organic acid into methane,
  wherein the contaminated water to be introduced into the acidification tank is diluted or the effluent from the acidification tank is deleted with a diluting water, thereby to control a $COD_{Cr}$ concentration of a polymer component other than the organic acid in the influent to be introduced into the methane production tank so as to be not more than 300 mg/L, and
  wherein the polymer component other than the organic acid is sugars, protein, or fats and oils, having 7 or more carbon atoms.

* * * * *